United States Patent
El-Demallawy et al.

(10) Patent No.: US 6,863,113 B2
(45) Date of Patent: Mar. 8, 2005

(54) MOULD FOR METAL CASTING

(75) Inventors: Emad El-Demallawy, Ingleburn (AU); Sasha Hamdy Radwan, North Rocks (AU)

(73) Assignee: Foseco International Limited, Tamworth (GB)

( * ) Notice: Subject to any disclaimer, the term of this patent is extended or adjusted under 35 U.S.C. 154(b) by 49 days.

(21) Appl. No.: 10/399,690

(22) PCT Filed: Oct. 31, 2001

(86) PCT No.: PCT/GB01/04849

§ 371 (c)(1),
(2), (4) Date: Apr. 22, 2003

(87) PCT Pub. No.: WO02/36289

PCT Pub. Date: May 10, 2002

(65) Prior Publication Data

US 2003/0183364 A1 Oct. 2, 2003

(30) Foreign Application Priority Data

Nov. 3, 2000 (GB) ............................. 0026902

(51) Int. Cl.$^7$ ................................. B22C 9/02
(52) U.S. Cl. ......................... 164/17; 164/456
(58) Field of Search .................... 164/17, 456

(56) References Cited

U.S. PATENT DOCUMENTS

| 4,504,314 A | * | 3/1985 | Barker et al. ............. 106/38.35 |
| 5,632,326 A | * | 5/1997 | Gough ........................ 164/529 |
| 6,286,581 B1 | * | 9/2001 | Gustafson .................... 164/17 |

FOREIGN PATENT DOCUMENTS

| DE | 198 11 008 | 1/2000 |
| EP | 0 891 954 | 1/1999 |
| FR | 2 686 081 | 7/1993 |

* cited by examiner

*Primary Examiner*—Kuang Y. Lin
(74) *Attorney, Agent, or Firm*—Nixon & Vanderhye P.C.

(57) ABSTRACT

A process for forming a mould or a core for casting molten metal by machining (e.g. cutting or drilling) to the desired shape a bonded particulate refractory material wherein the shear strength of the refractory particles is less than the shear strength of the bonds between the particles. The preferred particulate is aluminosilicate microspherers (e.g. "flyash floaters") and the binder is preferably based on silica (e.g. fumed silica/sodium hydroxide). The bonded particulate material is easily machined to form accurately dimensioned moulds or parts thereof.

15 Claims, No Drawings

MOULD FOR METAL CASTING

This application is the US national phase of international application PCT/GB01/04849 filed 31 Oct. 2001 which designated the U.S.

FIELD OF INVENTION

The present invention relates to the casting of metal and to the formation of moulds and cores for such castings.

BACKGROUND AND SUMMARY OF THE INVENTION

Conventionally, metal castings are produced in one of three basic methods: sand mould casting, die casting, and investment casting.

In sand mould casting, a mould and any associated cores (which define cavities in the casting) are formed from bonded sand. The mould cavity is formed from one or more patterns, i.e. models of the desired casting, around which the sand is moulded and bonded (by means of organic or inorganic binders) to create a cavity of the desired size and shape in the sand. Cores (where present) are formed by so-called "core-shooting" or "ramming" in which the core is blown by pressurized gas, or manually compacted, into a mould known as a core box and bonded (in the same way as the mould) to form the desired size and shape of core. The mould is then assembled from two or more body sections of bonded sand, plus any cores, also formed from bonded sand, inserted appropriately into the mould cavity. Molten metal is then poured into the mould cavity via one or more pre-formed sprues, allowed to coo! and solidify, and the sand mould and cores are broken away to reveal the metal casting.

In die-casting, the mould is a permanent mould (i.e. it is re-used many times) and is commonly formed from metal. In investment casting, a metal die is normally used to produce a pattern of the desired shape and size of the casting formed from wax. A series of refractory (i.e. heat resistant) coatings are coated onto the wax pattern by dipping the pattern into a slurry of refractory material and allowing each coating to dry before the next coating is applied. Once a shell mould of sufficient strength has been built up by this process, the wax pattern is burnt away so as to form a mould cavity into which molten metal is poured. When the metal has solidified, the shell mould is removed to reveal the casting.

In both sand mould casting and investment casting, therefore, it is necessary to produce a pattern from which the moulds and cores may be constructed. This is a time consuming and costly process, especially if only a small number of castings needs to be made, since the proportion of the time and cost of the process devoted to the production of the patterns in such cases is clearly much greater than if a large number of castings is to be produced. This principle is most extreme in the case of rapid prototyping, in which one or a few prototype castings need to be made quickly and cheaply. Conventionally, such rapid prototype castings are generally made by firstly producing a pattern of the casting by stereo lithography, in which a photocurable resin is cured to produce the desired casting shape by means of a computer controlled laser; a sand mould and cores are then produced from the stereo lithographic pattern, and a casting is made in the sand mould. Other methods of rapid prototyping are also known, in which the pattern is made from wood, or metal, or bonded sand, for example.

In die-casting, of course, a permanent mould needs to be made, and this obviously requires a very large investment in time and money, and is only suitable for very long casting production runs. Furthermore, die-casting is only suitable for casting low melting point metals, such as aluminium, and is not suitable for high temperature castings such as those formed from iron or steel.

EP-A-0913215 relates to the production of ferrules and other feeding head and supply elements for casting moulds, insulating and exothermics, by moulding a formulation comprising aluminium silicate hollow microbeads with an alumina content below 38% by weight, an agglomerant and optional loads, in non fibrous form.

U.S. Pat. No. 5,632,326 (assigned to Foseco International Ltd) discloses moulding a composition comprising hollow alumina- and silica-containing microspheres and a binder wherein the microspheres have defined silica and alumina content.

The present invention seeks to provide a casting process, and moulds and cores, which do not require the production and use of a pattern in order to create the moulds and cores. In particular, the invention seeks to provide a casting process (and moulds and cores for use in such a process) which is especially suitable for rapid prototyping and short production run casting, although the invention is not limited to such situations, and is generally applicable to the casting of metals.

According to a first aspect, the present invention provides a process of forming a mould or care for casting metal, comprising:
(a) forming a body of material comprising, at least in part:
  a bonded particulate refractory material, in which the shear strength of the refractory particles is less than the shear strength of the bonds between the particles; and
(b) machining the body to form a desired mould, core, or a component thereof, in or from the body.

A second aspect of the invention provides a process of casting metal, comprising:
(a) providing a mould formed, at least in part, from one or more machined bodies of material comprising, at least in part, bonded particulate refractory material, in which the shear strength of the refractory particles is less than the shear strength of the bonds between the particles; and
(b) pouring molten metal into the mould and allowing the metal to solidify.

A third aspect of the invention provides a casting mould or core, or a component thereof, formed from a machined body comprising bonded particulate refractory material, in which the shear strength of the refractory particles is less than the shear strength of the bonds between the particles.

DETAILED DESCRIPTION OF THE INVENTION

The invention has the advantage that because the shear strength of the refractory particles is less than the shear strength of the bonds between the particles, the mould or core can consequently be created directly by machining the bonded material, and the process therefore avoids the necessity of producing a pattern. This in turn creates a further advantage, namely that, unlike in conventional casting processes, it becomes unnecessary to produce a taper in the mould in order to enable removal of the pattern from the mould The terms particulate and "particles" as used herein include powders, fines, granules, fibres, microspheres, etc. At least in the broadest aspects of the invention, substantially any refractory material may be used, as long as the shear strength of the refractory material itself is less (preferably significantly less) than the shear strength of the bonds between the refractory particles. Especially preferred are lightweight refractory materials, including laminar materials, e.g. mica, perlite, vermiculite etc. The most preferred lightweight materials, however, are hollow microspheres (also known as "cenospheres"). Microspheres are generally formed as fly ash, and are often known as "fly ash floaters" since they are separated from the remainder of the fly ash by flotation in water tanks. Most microspheres are formed from alumina and/or silica—they normally comprise aluminosilicate, possibly with additional constituents. The particle size (diameter) of the particles is normally in the range 5–500 pm, more commonly in the range 10–350 µm, and the shell thickness of each microsphere is normally in the range 5–15% (e.g. approximately 10%) of the diameter of the microsphere. The hardness of the microspheres is generally 5 or 6 on the Mohs scale.

The present inventors have found that because of their thin-walled hollow shape, microspheres have relatively low shear strength, i.e. the microspheres themselves may be cut or otherwise machined while being bound together by a suitable binder. This property of the microspheres renders them particularly suitable for the present invention. A mixture of hollow microspheres and other refractory materials, e.g. lamellar materials and/or solid fly ash (i.e. the proportion of the fly ash which does not float in the separation process) may be used.

The types of refractory materials which are suitable have the additional advantage that they tend to have thermally insulating properties (in comparison to sand, for example). This produces the advantage that the degree of chill on the casting, i.e. the rate at which heat is removed from the metal, is generally reduced. This is advantageous partly because it can enable lower casting temperatures to be used, and partly because it can enable more reliable mould cavity filling (especially if the casting has an intricate shape) since the metal can remain molten for longer. A reduction in chill can also produce an improved surface finish on the casting.

As already mentioned, the particulate refractory materials are bonded together by means of a suitable binder Substantially any organic or inorganic binder for binding together particulate refractory materials may be used, as long as the bond so formed between the particles has a shear strength greater than (preferably significantly greater than) that of the particles themselves. Suitable organic binders include phenolic urethane binders, furan binders, alkaline phenol formaldehyde binders, epoxy-acrylic binders, etc. Suitable inorganic binders include silicate binders, for example sodium silicate plus ester binders. A particularly preferred binder is disclosed in co-pending international patent application no. PCT/GB00/03284, the entire disclosure of which is incorporated herein by reference. The binder disclosed in that document comprises: (a) a particulate metal oxide that is capable of forming a metalate in the presence of an alkali, (b) an alkali, and (c) water. An especially preferred form of the binder comprises silica (especially silica fume) as the metal oxide and sodium hydroxide as the alkali.

The body of bonded particulate refractory material is preferably produced by mixing together the refractory material and the binder, forming the mixture into the desired "preform" shape (i.e. a shape suitable for machining into the required mould, core or component), for example in a mould, and allowing the binder to cure. The method of curing depends, of courser upon the type of binder used. For example, phenolic urethane binders are cured by means of a polyisocyanate component being mixed with a phenolic resin component, with a liquid or gaseous tertiary amine catalyst, such as 4-phenylpropylpyridine or trimethylamine; furan (i.e. furfuryl alcohol plus urea formaldehyde or phenol formaldehyde resin) based binders are cured by means of a strong acid, e.g. xylene sulphonic acid or para toluene sulphonic acid; and aqueous alkaline phenol formaldehyde resins are cured by means of an ester, e.g. triacetin, or by means methyl formate gas. If a silicate binder is used, this may be cured by means of an ester or by means of carbon dioxide gas, for example. However, other curing methods may be used for silicates, including drying without the presence of carbon dioxide.

As mentioned above, a particularly preferred binder is the silica fume/sodium hydroxide binder disclosed in co-pending international patent application no. PCT/GB00/03284. When this binder is used, it is cured preferably by heating the formed mixture in an oven, either a conventional oven or a microwave oven.

It has been found by the present inventors that the relative proportions of particulate refractory material and binder are generally not critical to the satisfactory performance of the invention as long as, at one extreme there is sufficient binder to bond all of the particulate material together satisfactorily, and at the other extreme there is a sufficient proportion of the particulate material to confer the necessary degree of "refractoriness" appropriate for the casting temperature of the metal being cast, and the weight of the casting. However, generally speaking, there should be at least 5% binder, more preferably at least 10% binder, especially at least 20% binder (by weight, based on the total amount of binder plus particulate refractory material only). Normally there should be at least 5% refractory material, more preferably at least 10% refractory material, especially at least 20% refractory material (by weight, based on the total amount of binder plus particulate refractory material only). 20–50% binder and 50–80% particulate refractory material is generally the preferred range.

In addition to the particulate refractory material and the binder, additives may also be present, for example non-wetting additives and/or coatings to improve refractoriness and/or the release of the casting from the mould.

By the terms "machining", "machine" and "machined" as used in this specification are meant, at least in the broadest aspects of the invention, substantially any method of cutting, routing, grinding, engraving, drilling or similar, by which the body of bonded particulate refractory material may be shaped and sized to produce the requisite mould or core, or component thereof. A lathe, cutting machine, router, engraving machine, drill, laser, or substantially any suitable cutting or grinding apparatus may be used. The machining may additionally or alternatively be carried out manually. A particularly preferred machining apparatus is a so-called flat bed engraving machine. This machine is particularly suited to forming a mould cavity half in a slab of the bonded particulate refractory material, for example. Examples of types of castings which may be produced from such moulds include wall plaques, medallions, nameplates, and the like. However, less plate-like, more intricate shapes may also be produced in this way, also.

The invention will now be described in the following non-limiting example.

EXAMPLE

A binder "premix" was made by mixing together equal parts of silica fume powder and a 25% aqueous solution of sodium hydroxide. A body of bonded particulate refractory material, in accordance with the invention, was then prepared by mixing together 6 parts (by weight) of aluminosilicate microspheres (also known as "cenospheres" or "fly-ash floaters") with 4 parts (by weight) of the binder premix. This mixture was then shaped (by means of a simple mould) into a slab of dimensions 30 cm×30 cm×2.5 cm and the slab was dried in an air oven at 175° C. for 90 minutes. A 3-dimensional logo design was generated by computer, and a computer controlled flat bed engraving machine was then used to machine a negative of the logo design into the dried body of bonded particulate material. The machined body (now comprising a simple one-piece mould) was cleaned using a jet of pressurised air, and subsequently a molten copper-based gunmetal alloy was poured into the mould cavity in the machined body, and allowed to solidify. Once the metal had solidified and cooled to ambient temperature, the mould was broken away from the metal, to reveal a plaque having the logo design in 3-dimensional relief. The casting was found to have exceptional quality in terms of surface finish and accuracy of detail in the casting. This is believed to be due to the accuracy of the machining possible with the bonded particulate refractory material used In summary, the invention has the advantages that the casting process avoids the need of a pattern, thereby reducing time and cost, and it produces high quality castings because the accuracy of the machining of the bonded particulate body can be very high. Furthermore, since the refractory particulate material often has insulating properties (in comparison to sand, for example), the degree of metal chill in the castings may be reduced, thus enabling the use of lower casting temperatures than conventionally and/or enabling more reliable mould cavity filling.

What is claimed is:

1. A process of forming a mould or core for casting metal, comprising:
    (a) forming a body of material comprising, at least in part, a bonded particulate refractory material, in which the shear strength of the refractory particles is less than the shear strength of the bonds between the particles; and
    (b) machining the body to form a desired mould, core, or a component thereof, in or from the body.

2. A process as claimed in claim 1 wherein the body of material is formed by mixing together the particulate refractory material and a binder, forming the mixture into a desired shape, and allowing the binder to harden to form the bonded particulate refractory material.

3. A process as claimed in claim 2 wherein the particulate refractory material is bonded by means of an inorganic binder and/or an organic binder.

4. A process as claimed in claim 2 wherein the binder comprises a mixture of silica and alkali.

5. A process as claimed in claim 2 wherein the binder is hardened by heating the formed mixture.

6. A process as claimed in claim 1 wherein the particulate refractory material comprises a refractory fibre.

7. A process as claimed in claim 1 wherein the particulate refractory material comprises a lightweight refractory material, selected from the group consisting of mica, perlite and vermiculite.

8. A process as claimed in claim 1 wherein the particulate refractory material comprises hollow microspheres.

9. A process as claimed in claim 8 wherein the hollow microspheres comprise alumina and/or silica, preferably aluminosilicate.

10. A process as claimed in claim 1 wherein the bonding of the particles is achieved by means of a silicate and/or silica binder.

11. A process as claimed in claim 1 wherein the mould or core material further comprises one or more additives, preferably one or more non-wetting additives and/or coatings.

12. A process as claimed in claim 1 wherein the body is machined by means of one or more of: a cutting machine, a grinding machine, a router, a lathe, a drill, a laser and an engraving machine.

13. A process as claimed in claim 1 wherein the machining of the body is computer controlled.

14. A process for casting metal comprising pouring molten metal into a mould made from one or more components produced in accordance with claim 1, and allowing the metal to solidify.

15. A process for casting metal, comprising:
    (a) providing a mould formed, at least in part, from one or more machined bodies of material comprising, at least in pan, bonded particulate refractory material, in which the shear strength of the refractory particles is less than the shear strength of the bonds between the particles; and
    (b) pouring molten metal into the mould and allowing the metal to solidify.

* * * * *